United States Patent
Scheel et al.

(10) Patent No.: US 9,324,113 B2
(45) Date of Patent: Apr. 26, 2016

(54) PRESENTING SOCIAL NETWORK CONNECTIONS ON A SEARCH ENGINE RESULTS PAGE

(75) Inventors: Eric Robert Scheel, Sunnyvale, CA (US); Sameer Indarapu, Mountain View, CA (US); Rinal Patel, Richmond Hill (CA)

(73) Assignee: Microsoft Technology Licensing, LLC, Redmond, WA (US)

(*) Notice: Subject to any disclaimer, the term of this patent is extended or adjusted under 35 U.S.C. 154(b) by 1 day.

(21) Appl. No.: 13/338,521

(22) Filed: Dec. 28, 2011

(65) Prior Publication Data

US 2013/0097140 A1 Apr. 18, 2013

Related U.S. Application Data

(60) Provisional application No. 61/546,328, filed on Oct. 12, 2011.

(51) Int. Cl.
*G06F 17/30* (2006.01)
*G06Q 50/00* (2012.01)

(52) U.S. Cl.
CPC .......... *G06Q 50/01* (2013.01); *G06F 17/30867* (2013.01)

(58) Field of Classification Search
USPC .................................................. 707/769, 759
See application file for complete search history.

(56) References Cited

U.S. PATENT DOCUMENTS

| | | | |
|---|---|---|---|
| 2009/0164929 A1* | 6/2009 | Chen et al. | 715/769 |
| 2011/0137932 A1* | 6/2011 | Wable | 707/769 |
| 2011/0320423 A1* | 12/2011 | Gemmell et al. | 707/706 |

* cited by examiner

*Primary Examiner* — Amresh Singh
(74) *Attorney, Agent, or Firm* — David Ream; Tom Wong; Micky Minhas

(57) ABSTRACT

Systems, methods, and computer-readable storage media for presenting social network connections in association with a search engine results page (SERP) are provided. Upon receipt of a search query, it is determined if the query is a name query and if social networking data associated with the user is available. If it is determined that the query is a name query and that social networking data associated with the user is available, it is determined if there is a connection match to the query. If it is determined that one or more social network connections of the user match the name query, the matching social network connection is presented in association with the SERP. Additionally, the user may add a presented social network connection as a first degree connection and/or send a message to a presented connection from the context of the SERP.

20 Claims, 10 Drawing Sheets

PRESENTING SOCIAL NETWORK CONNECTIONS ON A SEARCH ENGINE RESULTS PAGE

CROSS-REFERENCE TO RELATED APPLICATIONS

This application claims priority to U.S. Provisional Patent Application No. 61/546,328, filed Oct. 12, 2011, and entitled "Presenting Social Network Connections on a Search Engine Results Page," which application is hereby incorporated by reference as if set forth in its entirety herein.

BACKGROUND

The Internet, through its billions of Web pages, provides a vast and quickly growing library of information and resources. In order to find desired content, computer users often make use of search utilities. Exemplary Internet search engines are well known in the art, for instance, a commonly known commercial engine is the BING search engine provided by Microsoft Corporation of Redmond, Wash.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable storage media for, among other things, presenting social network connections in association with a search engine results page. Upon receipt of a search query, it is determined if the query, or a portion thereof, is a name query. It is also determined if social networking data associated with the user is available. If it is determined that at least a portion of the query is a name query and that social networking data associated with the user is available, the name query is compared to information about the user's social network connections to determine if there is a connection that matches the name query. If it is determined that one or more social network connections of the user matches the name query, information about the matching social network connection is presented in association with the search engine results page, in addition to any matching Web results determined in response to the received query. Embodiments of the present invention further permit the user to add a presented social network connection as a first degree connection and/or send a message to a presented social network connection from the context of the search engine results page.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
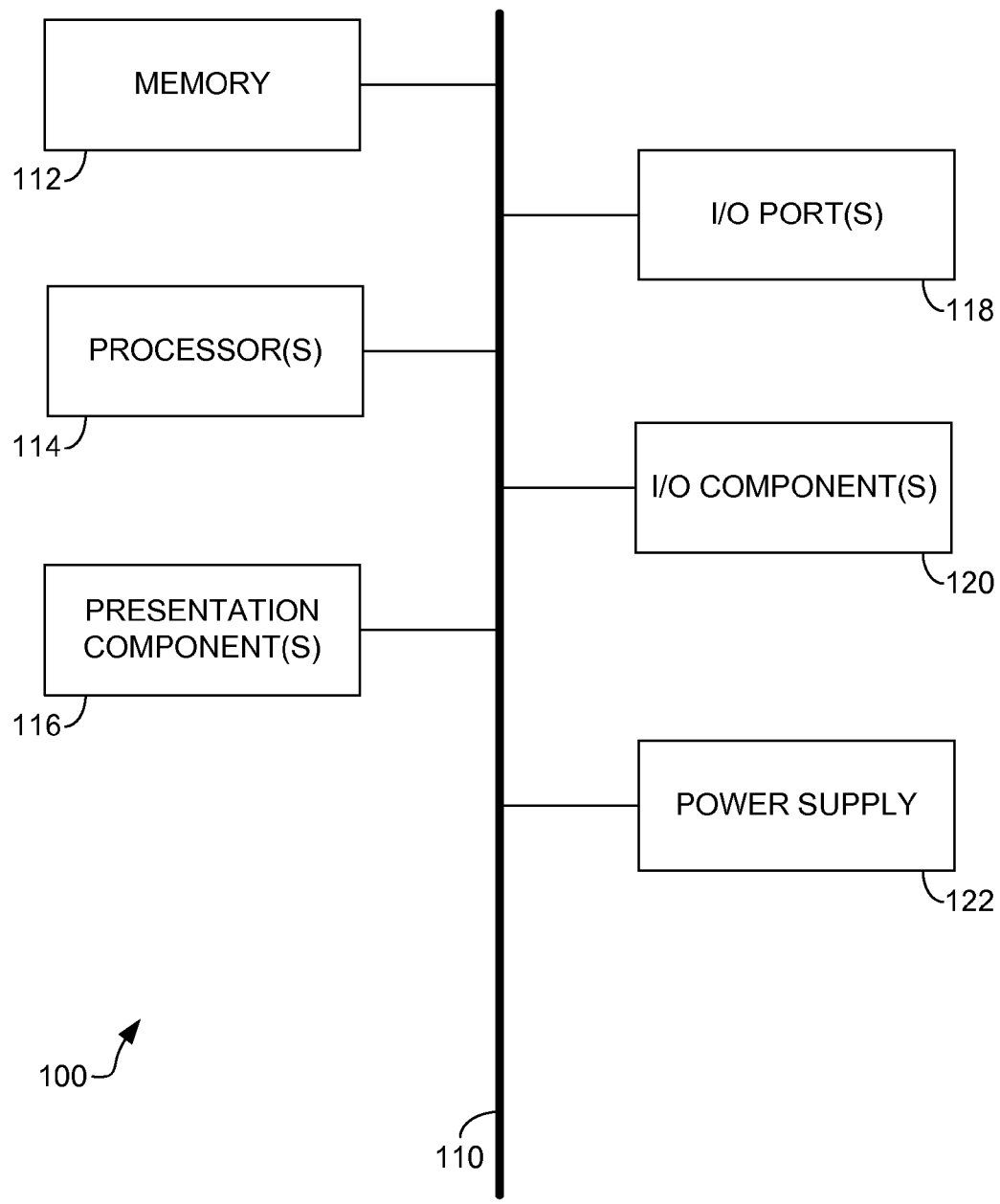
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for, among other things, presenting social network connections in association with a search engine results page (SERP) and in addition to any Web results determined to match an input search query. Upon receipt of a search query, it is determined if the query, or a portion thereof, is a name query. It is also determined if social networking data associated with the user is available. If it is determined that at least a portion of the query is a name query and that social networking data associated with the user is available, the name query is compared to information about the user's social network connections to determine if there is a connection that matches the name query. If it is determined that one or more social network connections of the user matches the name query, information about the matching social network connection is presented in association with the SERP in addition to any matching Web results determined in response to the received query. Embodiments of the present invention further permit the user to add a presented social network connection as a first degree connection and/or send a message to a presented social network connection from the context of the SERP.

Accordingly, one embodiment of the present invention is directed to one or more computer-readable storage media storing computer-useable instructions that, when used by one or more computing devices, cause the one or more computing devices to perform a method for enabling presentation of social network connections in association with SERPs. The method includes receiving a search query from a user; determining that at least a portion of the received search query is a name query; determining that data associated with one or more social network connections of the user is available; determining that the name query matches the data associated with the one or more social network connections of the user; and presenting information derived from the data associated with the one or more social network connections of the user and pertaining to the one or more social network connections of the user that matches the name query in association with a SERP.

Another embodiment of the present invention is directed to one or more computer-readable storage media storing computer-useable instructions that, when used by one or more computing devices, cause the one or more computing devices to perform a method for adding a social network connection to a user's social network from a Web page outside of a domain associated with a social networking application (e.g., a SERP). The method includes receiving a search query from a user, determining that at least a portion of the received search query is a name query, determining that data associated with one or more social network connections of the user is available, determining that the name query matches the data associated with the one or more social network connections of the user, and presenting information derived from the data associated with the one or more social network connections of the user and pertaining to the one or more social network connections of the user that matches the name query in association with a SERP. The method further includes presenting, in association with the SERP, a selectable option for the user to add at least one of the one or more social network connections of the user to the user's social network as a first degree connection.

In yet another embodiment, the present invention is directed to one or more computer-readable storage media storing computer-useable instructions that, when used by one or more computing devices, cause the one or more computing devices to perform a method for sending electronic messages to social network connections of a user from a Web page outside of a domain associated with a social networking application (e.g., a SERP), the electronic message appearing to the receiving social network connection as though it was sent from the social networking domain. The method includes receiving a search query from a user, determining that at least a portion of the received search query is a name query, determining that data associated with one or more social network connections of the user is available, determining that the name query matches the data associated with the one or more social network connections of the user, and presenting information derived from the data associated with the one or more social network connections of the user and pertaining to the one or more social network connections of the user that matches the name query in association with a SERP. The method further includes presenting, in association with the SERP, a selectable option for the user to send an electronic message to at least one of the one or more social network connections of the user.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Combinations of any of the above are also included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O component(s) 120. The presentation component(s) 116 present data indications to a user or other device. Exemplary presentation components include a display device, speaker, printing component, vibrating component, and the like.

The I/O port(s) 118 allow the computing device 100 to be logically coupled to other devices including the I/O component(s) 120, some of which may be built in. Illustrative I/) components include a microphone, joystick, game pad, satellite dish, scanner, printer, wireless device, and the like.

As previously mentioned, embodiments of the present invention are generally directed to systems, methods, and computer-readable storage media for, among other things, presenting social network connections in association with a SERP. Upon receipt of a search query, it is determined if the query, or a portion thereof, is a name query. It is also determined if social networking data associated with the user is available. If it is determined that at least a portion of the query is a name query and that social networking data associated with the user is available, the name query is compared to information about the user's social network connections to determine if there is a connection that matches the name query. If it is determined that one or more social network connections of the user matches the name query, information about the matching social network connection is presented in association with the SERP, in addition to any matching Web results determined in response to the received query. Embodiments of the present invention further permit the user to add a presented social network connection as a first degree connection and/or send a message to a presented social network connection from the context of the SERP.

Figure 2:
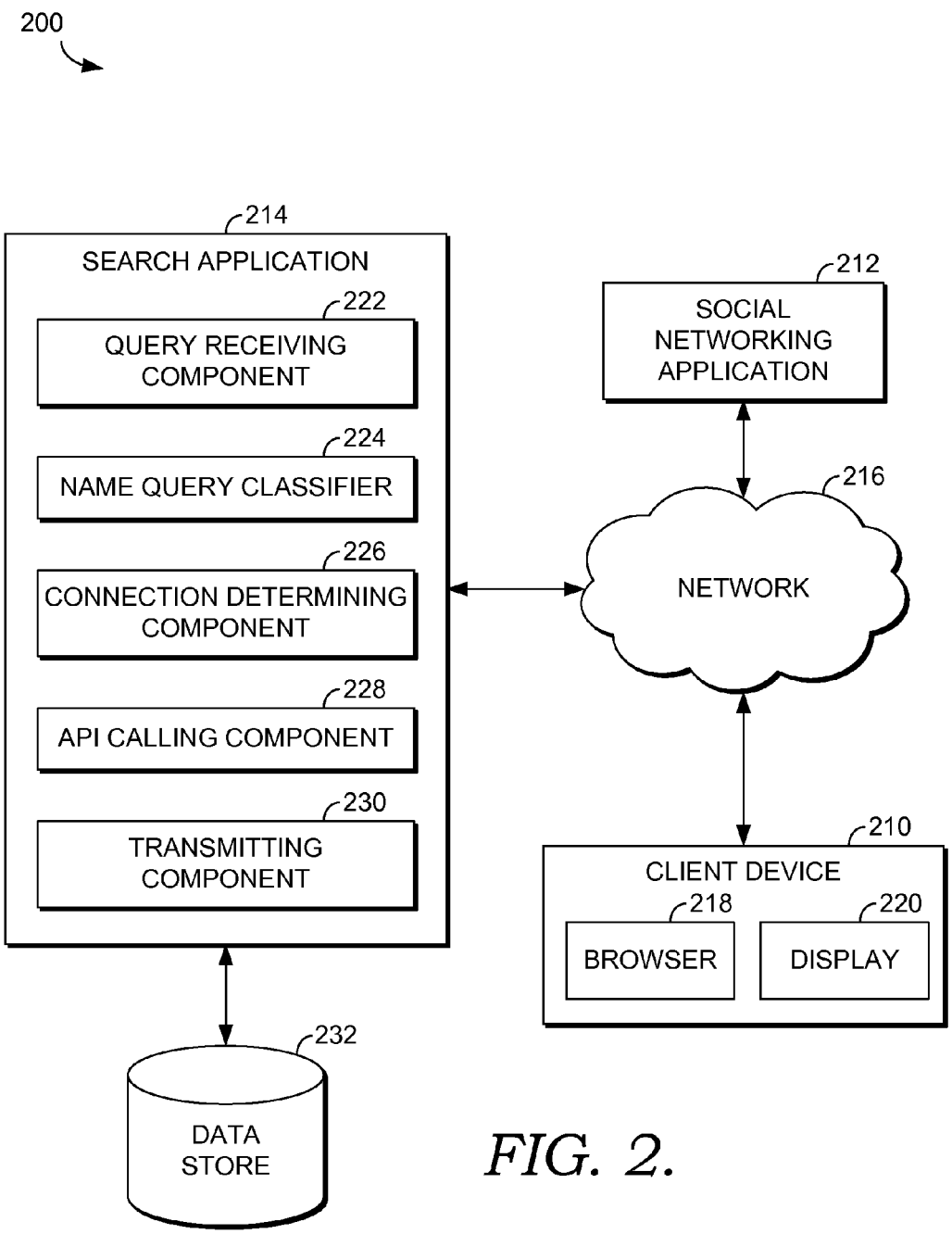
FIG. 2 is a block diagram of an exemplary computing system in which embodiments of the invention may be employed.

Referring now to FIG. 2, a block diagram is provided illustrating an exemplary computing system 200 in which embodiments of the invention may be employed. Generally, the computing system 200 illustrates an environment in which presentation of social network connections in association with SERPs is enabled. Embodiments of the present invention also provide systems and methods for permitting the user to add a first degree connection and/or send a message to a social network connection from the context of the SERP. In this way, users can search for and communicate with social network connections without directly accessing a social networking application.

Among other components not shown, the computing system 200 generally includes a client device 210, a social networking application 212, and a search application 214, all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

It should be understood that any number of client computing devices, social networking applications, and search applications may be employed in the computing system 200 within the scope of embodiments of the present invention. Each may comprise a single device/interface or multiple devices/interfaces cooperating in a distributed environment. For instance, the search application 214 may comprise multiple devices and/or modules arranged in a distributed environment that collectively provide the functionality of the search application 214 described herein. Additionally, other components/modules not shown also may be included within the computing system 200.

In some embodiments, one or more of the illustrated components/modules may be implemented as stand-alone applications. In other embodiments, one or more of the illustrated components/modules may be implemented via the client device 210, as an Internet-based service, or as a module inside the social networking application 212 and/or the search application 214. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of social networking applications, search applications, or client computing devices. By way of example only, the search application 214 might be provided as a single server (as shown), a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The client computing device 210 may include any type of computing device, such as the computing device 100 described with reference to FIG. 1, for example. Generally, the client computing device 210 includes a browser 218 and a display 220. The browser 218, among other things, is configured to render search engine home pages (or other online landing pages), and render SERPs in association with the display 220 of the client computing device 210. The browser 218 is further configured to receive user input of requests for various web pages (including search engine home pages), receive user inputted search queries (generally inputted via a user interface presented on the display 220 and permitting alpha-numeric and/or textual input into a designated search box) and to receive content for presentation on the display 220, for instance, from the search application 214. It should be noted that the functionality described herein as being performed by the browser 218 may be performed by any other application capable of rendering Web content. Any and all such variations, and any combination thereof, are contemplated to be within the scope of embodiments of the present invention.

The social networking application 212 is configured to facilitate electronic social networking between its users. In this regard, the social networking application is configured to receive input of identifying information about a user and maintain such information, for instance, in a data store (not shown) associated with the social networking application 212. Identifying information may include, but is not limited to, a user profile page (the name of which is generally the name of the user to whom it pertains), one or more networks of the user, a location of the user, interests of the user, and the identity of other users with whom the user has established connections. The identifying information about the user may be input directly by the user (e.g., name, location, interests, etc.) or may be derived from information input or otherwise provided by the user. For instance, if a user inputs that s/he attended College A or that s/he works at Company B, networks associated with College A and/or Company B may be associated with the user. Exemplary social networking applications are well known in the art, for instance, a commonly known social networking application is FACEBOOK, INC. of Palo Alto, Calif.

The social networking application 212 further is configured to permit its users to establish social network connections with other application users. In this way, a user may be connected to another user by a first degree connection (e.g., a "friend") meaning that the two users are directly connected with one another. Or, a user may not be directly connected with another user but have a second degree connection (e.g, a "friend of a friend") or more remote connection with that user through his/her first degree connections.

The search application 214 is configured to receive and respond to requests that it receives from components associated with client computing devices, for instance, the browser 218 associated with the client computing device 210. Those skilled in the art of the present invention will recognize that the present invention may be implemented with any number of searching utilities. For example, an Internet search engine or a database search engine may utilize the present invention. These search engines are well known in the art, and commercially available engines share many similar processes not further described herein.

As illustrated, the search application 214 includes a query receiving component 222, a name query classifier 224, a connection determining component 226, an Application Programming Interface (API) calling component 228, and a transmitting component 230. The illustrated search application 214 also has access to a data store 232. The data store 232 is configured to store information pertaining to user social networking identifiers and connections of users. In various embodiments, such information may include, without limitation, names of its users' profile pages, an identity of networks of its users, a location of its users and information about its users' social network connections (first degree connections and those that are more distant or remote). In embodiments, the data store 232 is configured to be searchable for one or more of the items stored in association therewith. It will be understood and appreciated by those of ordinary skill in the art that the information stored in association with the data store 232 may be configurable and may include any information relevant to social networking identifiers and social network connections of a plurality of users. The content and volume of such information are not intended to limit the scope of embodiments of the present invention in any way. Further, though illustrated as a single, independent component, the data store 232 may, in fact, be a plurality of storage devices, for instance a database cluster, portions of which may reside in association with the search application 214, the social networking application 212, the client computing device 210, another external computing device (not shown), and/or any combination thereof.

The query receiving component 222 of the search application 214 is configured to receive requests for presentation of SERPs having results that satisfy an input search query (e.g., matches identified via keyword matching). Typically, such a request is received via a browser associated with a client computing device, for instance, the browser 218 associated with the client computing device 210. In embodiments, received requests for presentation of SERPs having satisfying search results are also requests for presentation of results that are additional or supplemental to the Web search results satisfying the search query (e.g., instant answers).

Upon receiving a query input by a user, the name query classifier 224 is configured to determine whether or not the input query is a name query. A "name query," as the term is utilized herein, is a query that in whole or in part includes a name. For instance, a query that is in whole a name query may be the query "Bob Smith." A query that is in part a name query may be the query "Bob Smith Seattle." Name query classifiers generally utilize a list of known names (exact and derivative versions) and employ a machine learning algorithm that examines an input query and outputs information concerning any matches (exact or derivative, as desired). Name query classifiers are known to those of ordinary skill in the art and, accordingly, are not further described herein.

Once a query (or a portion thereof) is identified as a name query, the connection determining component 226 is configured to determine whether social networking information about the user is available. In embodiments, such determination is made by determining whether or not the requesting user is engaged in an active session with the social networking application 212. A user may be engaged in an active session with the social networking application 212 by having a browser window actively logged into the social networking application 212. A user may also be engaged in an active session with the social networking application 212 even without having an active window if s/he has opted in a previous active session with the social networking application 212 to stay logged into the service even upon closure of the browser session. In another embodiment, the user may login to the social networking application 212 from the search application 214 using a social networking identifier associated with the user. Any and all such variations, and any combination thereof, are contemplated to be within the scope of embodiments of the present invention. However the user establishes an active session with the social networking application 212, being engaged in such active session permits the search application 214 to access information about the user's social network connections. The connection determining component 226 is further configured to receive the user's social networking identification (ID) from the social networking application 212.

By way of example only, the exemplary social networking application FACEBOOK, INC. of Palo Alto, Calif. employs an "instant personalization" functionality that automatically (that is, without an opt-in authentication process) enables users of FACEBOOK, INC. to log onto third party websites (e.g., the search application 214) with their FACEBOOK identity and access their FACEBOOK identity information from the context of the third party website.

The API calling component 228 is configured to determine whether any connections of the requesting user match the name query. In embodiments, the API calling component 228 makes a call to an API associated with the social networking application 212, the call including at least the name query and the user's social networking identification. In other embodiments, a call is made to an API associated with a data store (e.g., data store 232) maintained by the search application 214 that includes the same information. Any and all such variations, and any combination thereof, are contemplated to be within the scope of embodiments of the present invention.

Upon receipt of the API call, the social networking application 212 (and/or the data store 232, as appropriate) determines whether any matches exist between the name query and the user's social network connections. In embodiments, only first degree connections are identified as matching. In other embodiments, more remote connections may be identified as matching as well. If any matches exist, information about the matching social network connections is returned to the API calling component 228 for transmission to the user (e.g., via the transmitting component 230 of the search application 214). Such information may include, without limitation, a name of any matching connection's profile page, an identity of one or more networks of a matching connection, a location associated with a matching connection and an image associated with a matching connection's profile.

The transmitting component 230 is configured to transmit the matching connection information to the requesting user for presentation as a result or answer on a SERP (e.g., on the display 220 associated with the client computing device 210). Presentation of matching connections is discussed more fully below with reference to FIGS. 6, 7 and 8.

"Instant answers" refers to small snippets of information related to the keywords in a received query that are determined to be the most likely answer to the input query. Such results generally are determined independently of the algorithmically-derived Web search results and are thus results that are additional or supplementary to the Web search results satisfying the search query. In embodiments, such additional or supplemental results are presented in a specified area of the SERP that is differentiated from the Web search results. In other embodiments, such additional or supplemental results are integrated and presented in association with the algorithmically-derived search results. Exemplary additional or supplemental results (instant answers) may include weather answers, news answers, sports answers, and the like. In accordance with embodiments of the present invention, information pertaining to social network connections of the user may be presented on the SERP as supplemental or additional search results.

Figure 3:
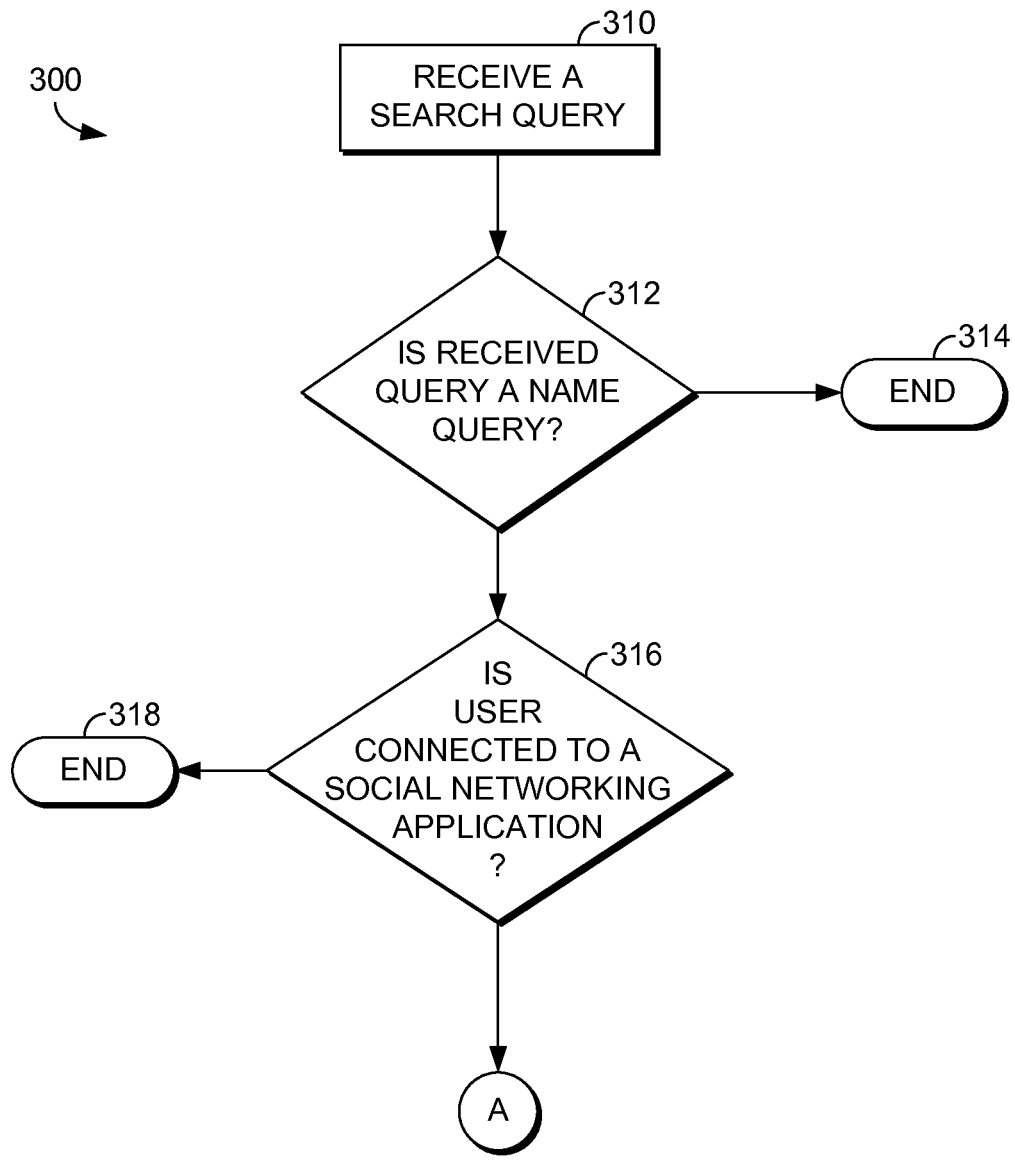
FIG. 3 is a flow diagram showing an exemplary method for presenting social network connections in association with a search engine results page and in addition to any Web results matching an input search query, in accordance with an embodiment of the present invention.

With reference now to FIG. 3, a flow diagram is illustrated showing an exemplary method 300 for presenting social network connections in association with a SERP, in accordance with an embodiment of the present invention. As indicated at block 310, a search query is received, e.g., via a search query input field of a user interface associated with a search application (for instance, utilizing the query receiving component 222 of the search application 214 of FIG. 2). As indicated at block 312, it is then determined if the received query, or a portion thereof, is a name query (e.g., utilizing name query classifier 224 of the search application 214 of FIG. 2). If it is determined that the received query is not, in whole or in part, a name query, the method terminates, as indicated at block 314. If, however, it is determined that at least a portion of the received query is a name query, it is next determined if the requesting user is connected to a social networking application (e.g., utilizing connection determining component 226 of FIG. 2). If it is determined that the user is not connected to a social networking application, and thus that data associated with social network connections of the user is not available, the method terminates, as indicated at block 318. If, however, it is determined at block 316 that the user is connected to a social networking application, and thus that data associated with social network connections of the user is available, the method continues as shown in either of FIG. 4 or 5, each showing different embodiments of the present invention, as more fully described below.

Figure 4:
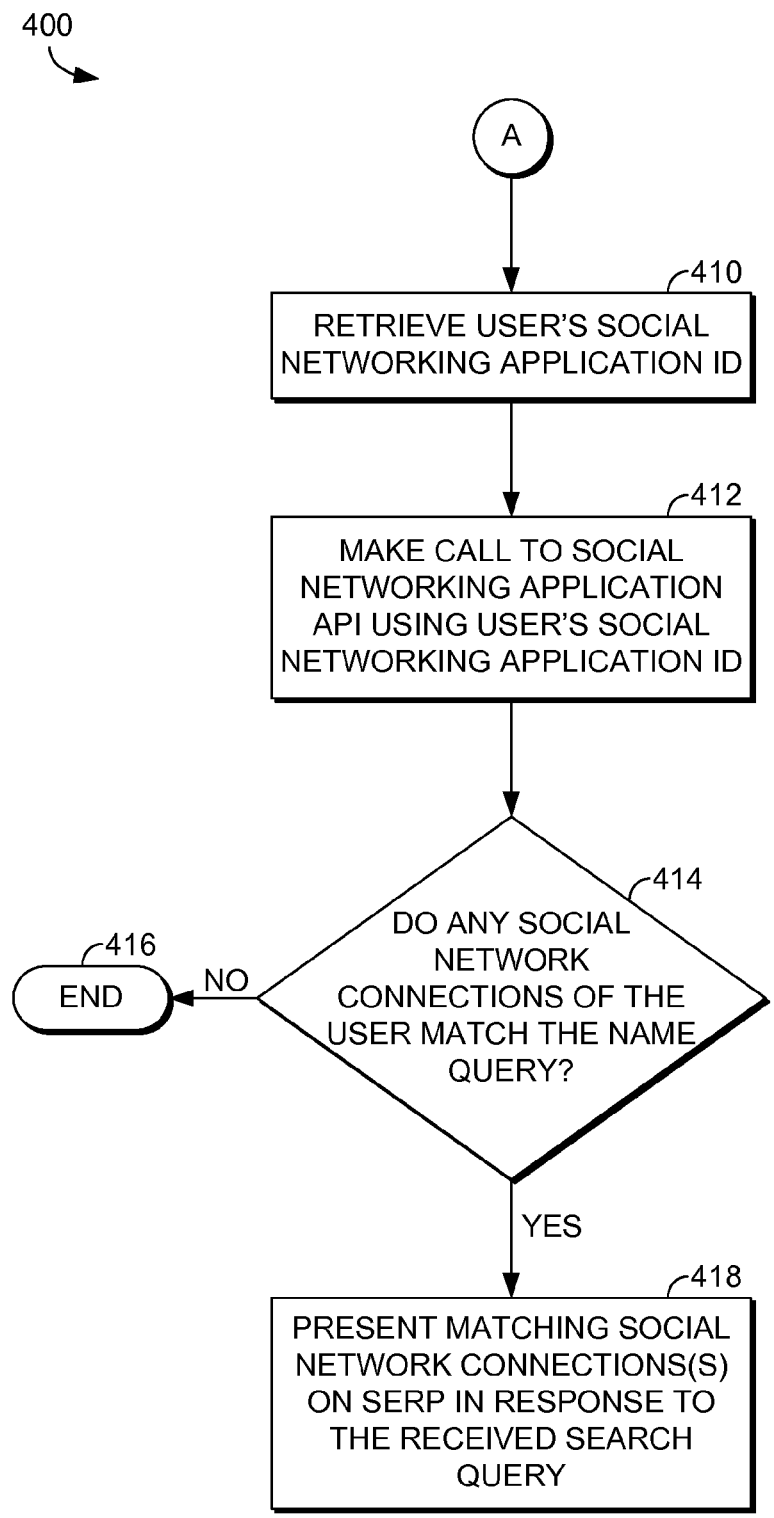
FIG. 4 is a flow diagram showing one embodiment of an exemplary method for presenting social network connections in association with a search engine results page and in addition to any Web results matching an input search query, in accordance with an embodiment of the present invention.

With reference to FIG. 4, a flow diagram is shown illustrating an exemplary method 400 for presenting social network connections in association with a SERP utilizing data directly retrieved from a social networking application (e.g., social networking application 212 of FIG. 2), in accordance with an embodiment of the present invention. Upon completion of the method 300 illustrated in FIG. 3 and discussed herein above, a user's social networking application identification (ID) is retrieved, as indicated at block 410. A call is then made to an Application Programming Interface (API) associated with the social networking application using the user's social networking application ID. This is indicated at block 412. Utilizing data maintained by the social networking application, it is determined if any social network connections of the user match the name query, as indicated at block 414. The number of degrees removed from the requesting user a satisfying social network connection may be is variable as desired. In embodiments, only first degree and second degree connections are identified. If no social network connections of the user match the name query, the method terminates, as indicated at block 416. If, however, one or more social network connections of the user match the received name query, data associated with the one or more matching connections is presented on the SERP in response to the received search query as a search result and/or an answer to the query. This is indicated at block 418.

Figure 5:
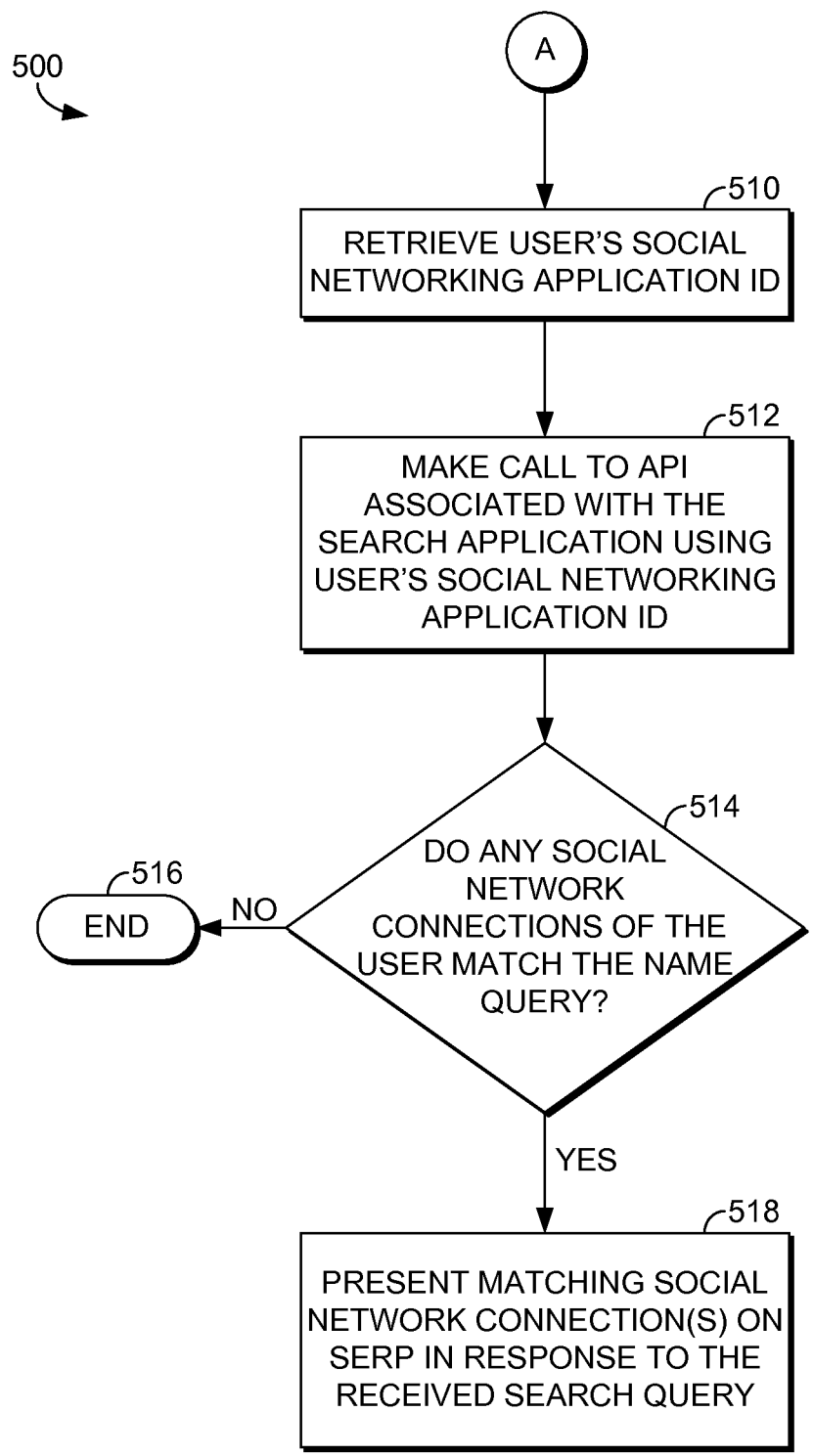
FIG. 5 is a flow diagram showing another embodiment of an exemplary method for presenting social network connections in association with a search engine results page and in addition to any Web results matching an input search query, in accordance with an embodiment of the present invention.

With reference to FIG. 5, a flow diagram is shown illustrating an exemplary method 500 for presenting social network connections in association with a SERP utilizing data retrieved from a data store associated with a search application (e.g., the search application 214 of FIG. 2), in accordance with an embodiment of the present invention. Upon completion of the method 300 illustrated in FIG. 3 and discussed herein above, a user's social networking application ID is retrieved, as indicated at block 510. A call is then made to an API associated with the search application using the user's social networking application ID. This is indicated at block 512. Utilizing data maintained by the search application (e.g., in association with the data store 232 of FIG. 2), is determined if any social network connections of the user match the name query, as indicated at block 514. If no social network connections of the user match the name query, the method terminates, as indicated at block 516. If, however, one or more social network connections of the user match the received name query, data associated with the one or more matching connections is presented on the SERP in response to the received search query as a search result and/or an answer to the query. This is indicated at block 518.

Figure 6:
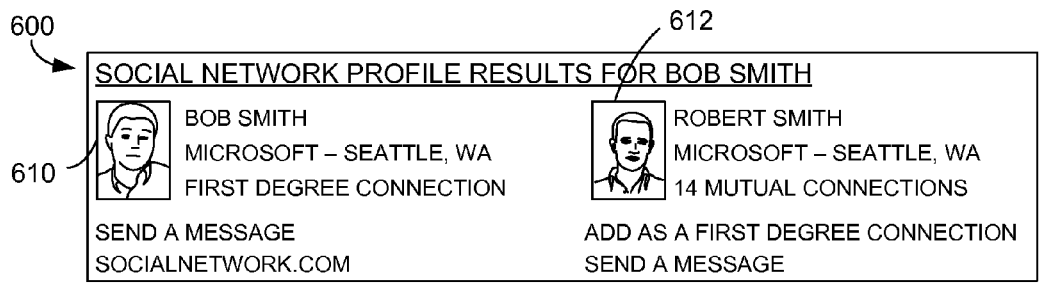
FIG. 6 is a schematic diagram showing an exemplary screen display illustrating presentation of a social network connection in association with a search engine results page, in accordance with an embodiment of the present invention.

With reference to FIG. 6, a schematic diagram is illustrated showing an exemplary screen display 600 of a presentation of a social network connection in association with a SERP and in response to a name query, in accordance with an embodiment of the present invention. In the illustrated example, the input search query was "Bob Smith." Two social network connections of the requesting user were identified. The first 610 is a first degree connection of the user and has an associated social networking profile with the name "Bob Smith." A network associated with the connection ("Microsoft") and a location associated with the connection ("Seattle, Wash.") are identified, as is the nature of the connection (i.e., "Your First Degree Connection"). A thumbnail image associated with Bob Smith is also shown. With respect to this first degree connection, the user is presented with an option to "Send a Message" to Bob Smith, as more fully described below with reference to FIG. 7. It should be noted that in accordance with embodiments hereof, social network connections may be presented as illustrated but without the "Send a Message" indicator or functionality.

The second social network connection 612 presented is a second degree connection of the user (or more distant connection of the user) and has an associated social networking profile with the name "Robert Smith." A network associated with Robert Smith ("Microsoft") and a location associated with Robert Smith ("Seattle, Wash.") are identified. The nature of the connection is implicitly identified by the indication that the user and Robert Smith have "14 mutual connections." Note that there is no indication that Robert Smith is a first degree connection of the user as was present with the connection Bob Smith 610. Not also that in addition to the option to "Send a message" to Robert Smith, the user is presented with an option to add Robert Smith as a first degree connection (i.e., "Add as a First Degree Connection"). The presented information makes it clear that Robert Smith is connected to the requesting user by a more remote or distant connection than a first degree connection. The functionality to "Add as a First Degree Connection" from the SERP is more fully described below with respect to FIG. 8.

Figure 7:
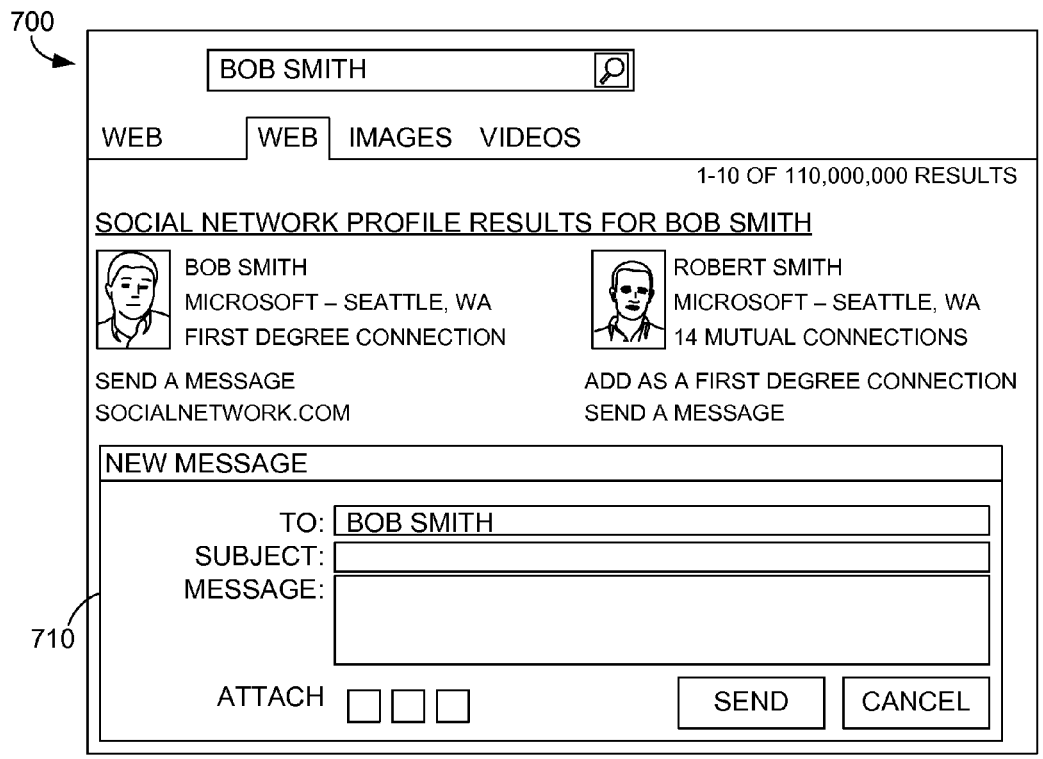
FIG. 7 is a schematic diagram showing an exemplary screen display illustrating presentation of a social network connection having functionality to send an electronic message to an entity associated with a social networking application from the context of a Web page not associated with the social networking application domain, in accordance with an embodiment of the present invention.

With reference to FIG. 7, a schematic diagram is shown of an exemplary screen display 700 illustrating presentation of a social network connection having functionality to send an electronic message to an entity associated with a social networking application from the context of a Web page not associated with the social networking application domain (e.g., the SERP), in accordance with an embodiment of the present invention. As illustrated, upon user selection of the "Send a Message" indicator associated with the first degree connection "Bob Smith", a popup window 710 is presented in line with the SERP that has some of the information already populated (namely, the intended recipient of the message). In this way, the user is permitted, from the context of the SERP, to send a message that would appear to the receiving user as if sent directly from the social networking application. In another embodiment (not shown), selection of the "Send a message" indicator would automatically navigate the user away from the SERP and into the social networking application for sending a message to the connection that is the subject of the presented search result. Note that the same functionality would apply upon selection of the "Send a Message" indicator associated with the more remote connection "Robert Smith."

Figure 8:
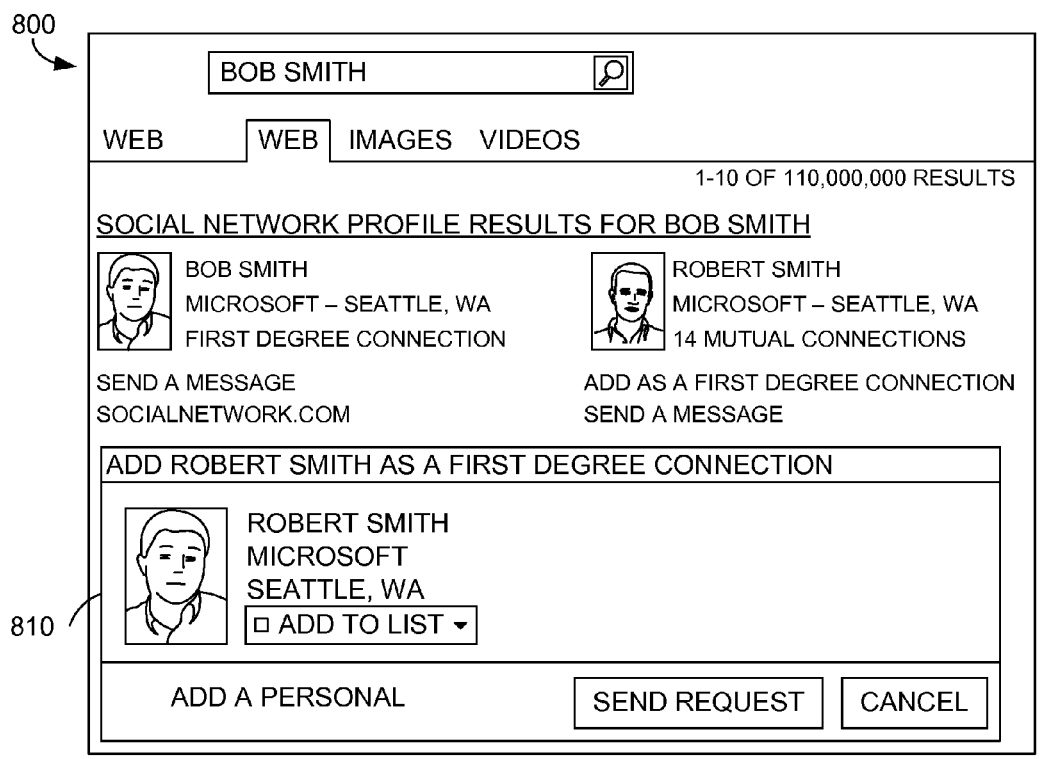
FIG. 8 is a schematic diagram showing an exemplary screen display illustrating presentation of a social network connection having functionality to add a connection to a user's social network from the context of a Web page not associated with the social networking application domain, in accordance with an embodiment of the present invention.

Turning now to FIG. 8, a schematic diagram is shown of an exemplary screen display 800 illustrating presentation of a social network connection having functionality to add a connection to a user's social network from the context of a Web page not associated with the social networking application domain (e.g., the SERP), in accordance with an embodiment of the present invention. As illustrated, upon user selection of the "Add as a First Degree Connection" indicator associated with the second degree (or more remote) connection "Robert Smith", a popup window 810 is presented in line with the SERP. In this way, the user is permitted, from the context of the SERP, to add a first degree connection to the user's social network. In another embodiment (not shown), selection of the "Add as a First Degree Connection" indicator would automatically navigate the user away from the SERP and into the social networking application for adding the connection that is the subject of the presented search result as a first degree connection in the user's social network.

Figure 9:
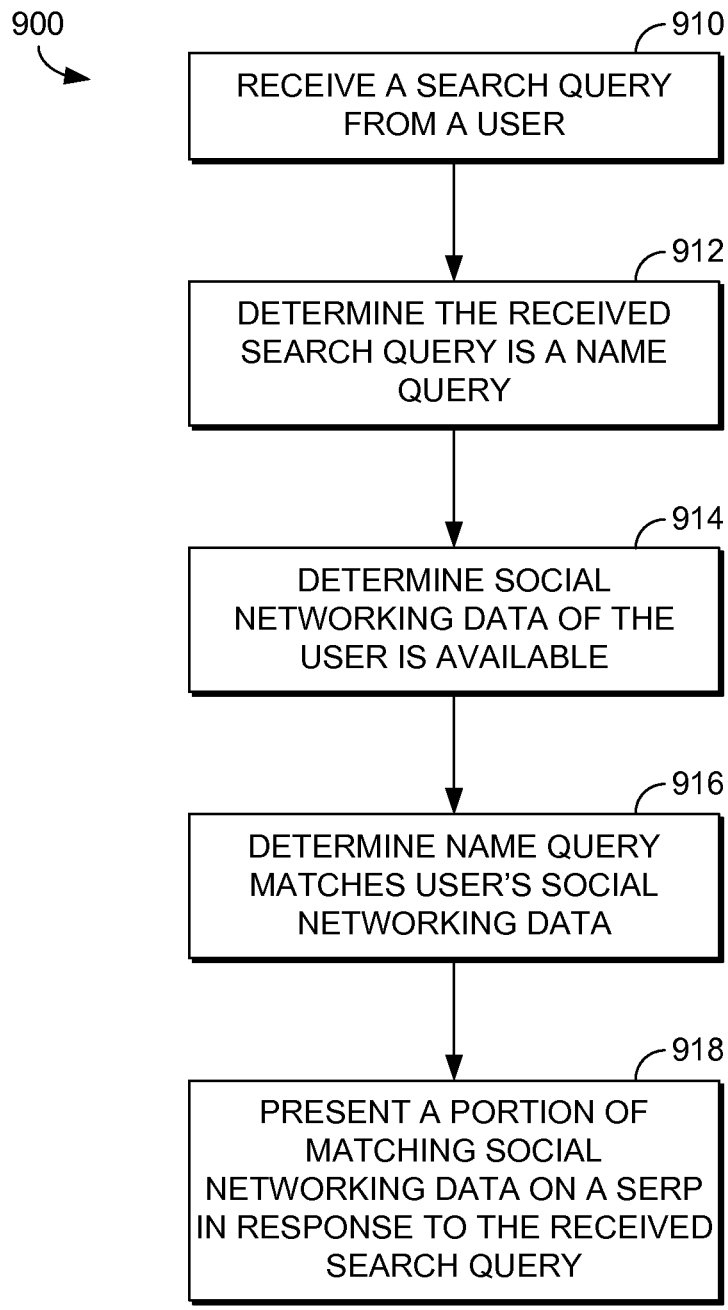
FIG. 9 is a flow diagram showing an exemplary method for enabling presentation of social network connections in association with a search engine results page and in addition to any Web results matching an input search query, in accordance with an embodiment of the present invention.

With reference now to FIG. 9, a flow diagram is provided that illustrates an exemplary method 900 for enabling presentation of social network connections in association with SERPs and in addition to any Web results matching an input search query, in accordance with an embodiment of the present invention. Initially, as indicated at block 910, a search query is received from a user, e.g., via a search query input field of a user interface associated with a search application. As indicated at block 912, it is then determined if the received query, or at least a portion thereof, is a name query. It also is determined, at indicated at block 914, that data associated with one or more social network connections of the user is available. In accordance with embodiments hereof, such data is determined to be available if the user connected to a social networking application.

As indicated at block 916, it is determined that the name query matches data associated with one or more social network connections of the user. Such determination may be made by making a call to an API associated with the search application or an API associated with the social networking application, in accordance with embodiments hereof. As indicated at block 918, information derived from the data associated with the one or more social network connections of the user and pertaining to the matching social network connections is presented in association with a SERP.

Figure 10:
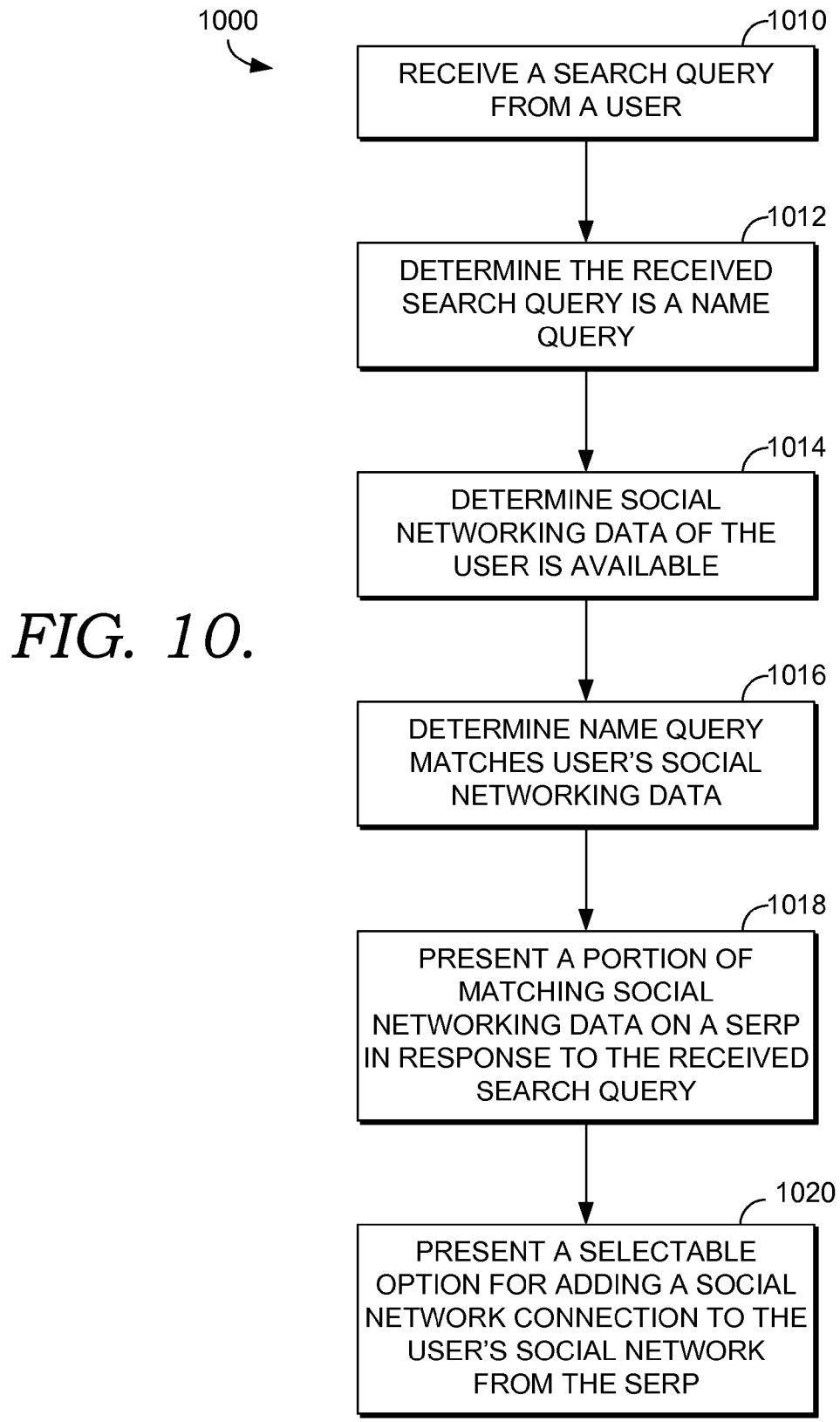
FIG. 10 is a flow diagram showing an exemplary method for adding a social network connection to a user's social network from a search engine results page, in accordance with an embodiment of the present invention.

With reference now to FIG. 10, a flow diagram is provided that illustrates an exemplary method 1000 for adding a social network connection to a user's social network from a search engine results page, in accordance with an embodiment of the present invention. Initially, as indicated at block 1010, a search query is received from a user, e.g., via a search query input field of a user interface associated with a search application. As indicated at block 1012, it is then determined if the received query, or at least a portion thereof, is a name query. It also is determined, at indicated at block 1014, that data associated with one or more social network connections of the user is available. In accordance with embodiments hereof, such data is determined to be available if the user connected to a social networking application.

As indicated at block 1016, it is determined that the name query matches data associated with one or more social network connections of the user. Such determination may be made by making a call to an API associated with the search application or an API associated with the social networking application, in accordance with embodiments hereof. As indicated at block 1018, information derived from the data associated with the one or more social network connections of the user and pertaining to the matching social network connections is presented in association with a SERP. As indicated at block 1020, a selectable option for the user to add at least one of the one or more social network connections of the user to the user's social network as a first degree connection is presented in association with the SERP.

Figure 11:
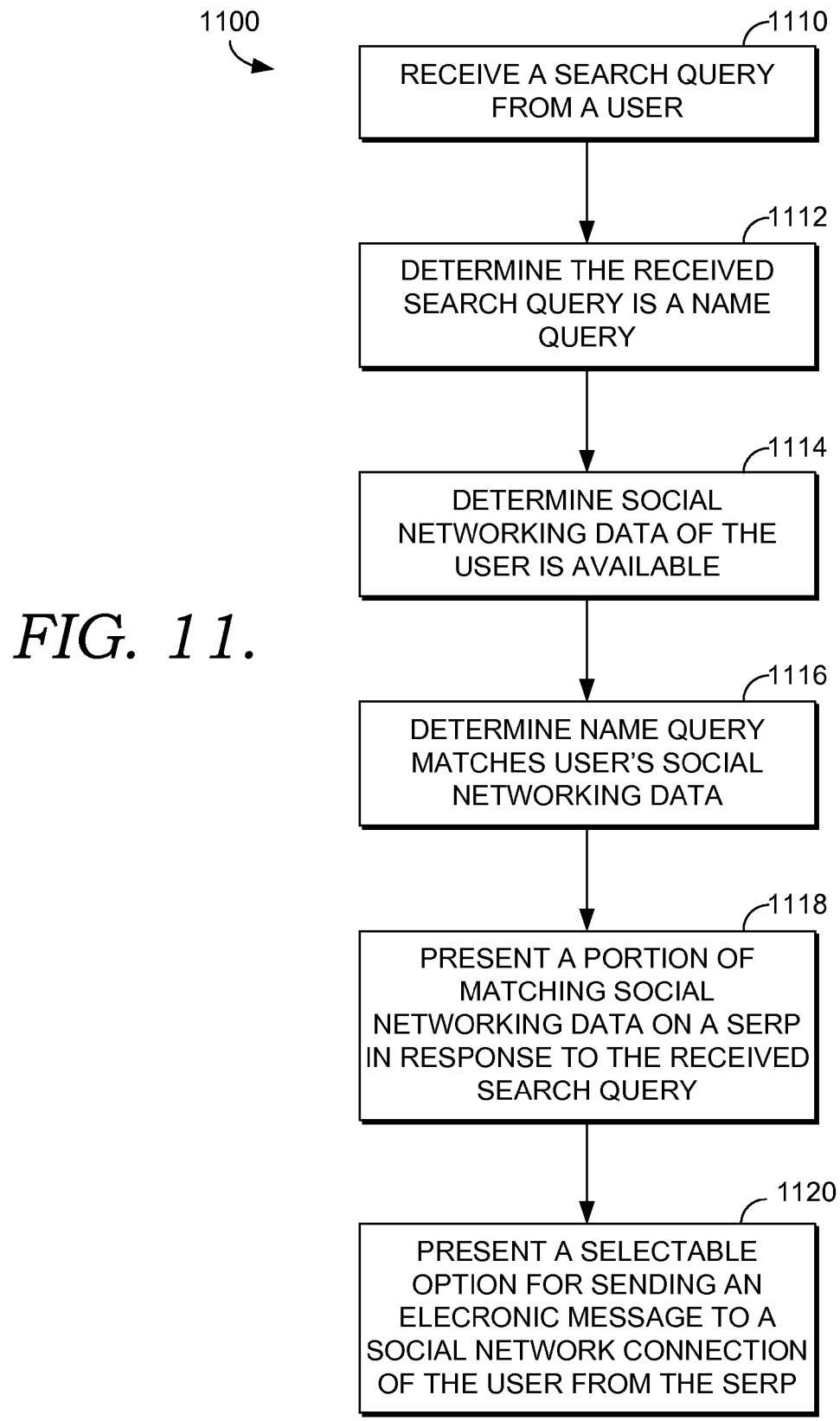
FIG. 11 is a flow diagram showing an exemplary method for sending electronic messages to social network connections of a user from search engine results page, the electronic messages appearing to the receiving social network connections as though it was sent from a social networking domain, in accordance with an embodiment of the present invention.

Turning to FIG. 11, a flow diagram is provided that illustrates an exemplary method 1100 for sending electronic messages to social network connections of a user from search engine results page, the electronic messages appearing to the receiving social network connections as though it was sent from a social networking domain, in accordance with an embodiment of the present invention. Initially, as indicated at block 1110, a search query is received from a user, e.g., via a search query input field of a user interface associated with a search application. As indicated at block 1112, it is then determined if the received query, or at least a portion thereof, is a name query. It also is determined, at indicated at block 1114, that data associated with one or more social network connections of the user is available. In accordance with embodiments hereof, such data is determined to be available if the user connected to a social networking application.

As indicated at block 1116, it is determined that the name query matches data associated with one or more social network connections of the user. Such determination may be made by making a call to an API associated with the search application or an API associated with the social networking application, in accordance with embodiments hereof. As indicated at block 1118, information derived from the data associated with the one or more social network connections of the user and pertaining to the matching social network connections is presented in association with a SERP. As indicated at block 1120, a selectable option for the user to send an electronic message to at least one of the one or more social network connections of the user is presented in association with the SERP.

As can be understood, embodiments of the present invention provide systems and methods for presenting social network connections in association with a SERP. The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 300 of FIG. 3, the method 400 of FIG. 4, the method 500 of FIG. 5, the method 900 of FIG. 9, the method 1000 of FIG. 10, and the method 1100 of FIG. 11 are not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer memory storing computer-executable instructions that, when executed by one or more computing devices, cause the one or more computing devices to perform a method for enabling presentation of social network connections in association with a search engine results page, wherein the search results page is outside of a social networking application's domain, the method comprising:
   at a browser configured to render at least one SERP (search engine results page), wherein the SERP is outside of a domain associated with a social networking application, receiving a search query from a user;
   determining that at least a portion of the received search query is a name query;
   determining that the user is engaged in an active session with the social networking application and that data associated with one or more social network connections of the user is available from the social networking application;
   accessing an API associated with the social networking application by making a call to the API associated with the social networking application, wherein the call includes at least the name query and the user's social networking identification;
   determining that the name query matches the data associated with the one or more social network connections of the user by accessing the social networking application;
   presenting, on the SERP that is outside of the domain associated with the social networking application, information derived from the data associated with the one or more matching social network connections of the user, as a supplementary search result in a specified area of the SERP that is differentiated from any other matching Web results determined in response to the received query, with a selectable option for the user to add at least one of the one or more social network connections of the user to the user's social network as a first degree connection without directly accessing the social networking application; and
   upon selection by the user of the option to add the at least one of the one or more social network connections as a first degree connection, automatically navigating the user away from the SERP and into the social networking application.

2. The memory of claim 1, wherein the data associated with the one or more social network connections of the user is retrieved from a data store associated with the social networking application.

3. The memory of claim 1, wherein receiving the search query from the user comprises receiving the search query via a user interface associated with a search application, and wherein the data associated with the one or more social network connections of the user is retrieved from a data store associated with the search application.

4. The memory of claim 1, wherein determining that the name query matches the data associated with the one or more social network connections of the user comprises determining that the name query is an exact match with the data associated with at least one of the one or more social network connections of the user.

5. The memory of claim 1, wherein determining that the name query matches the data associated with the one or more social network connections of the user comprises determining that the name query is a derivative match with the data associated with at least one of the one or more social network connections of the user.

6. The memory of claim 1, wherein the data associated with the one or more social network connections of the user comprises a profile page associated with each of the one or more social network connections of the user, and wherein determining that the name query matches the data associated with the one or more social network connections of the user comprises determining that the name query matches a name of the profile page associated with at least one of the one or more social network connections of the user.

7. The memory of claim 1, wherein the one or more social network connections of the user include at least one of first degree social network connections and second degree social network connections.

8. The memory of claim 1, wherein the method further comprises: presenting, in the specified area of the SERP that is outside of the domain associated with the social networking application, a selectable option for the user to send an electronic message to at least one of the one or more social network connections of the user.

9. The memory of claim 8, wherein the electronic message would appear to a recipient user as if the electronic message was sent directly from the social networking application.

10. A computer system for adding a social network connection to a user's social network from a search engine results page (SERP), the system comprising:
- a computing device associated with one or more processors and one or more computer memory;
- a data store coupled with the computing device; and
- a search engine that:
    (1) renders at least one SERP, wherein the search engine and the at least one SERP are outside of a domain associated with a social networking application,
    (2) receives a search query from a user,
    (3) determines that at least a portion of the received search query is a name query,
    (4) determines that the user is engaged in an active session with the social networking application and that data associated with one or more social network connections of the user is available from the social networking application,
    (5) determines that the name query matches the data associated with the one or more social network connections of the user,
    (6) presents, on the SERP that is outside of the domain associated with the social networking application, information derived from the data associated with the one or more social network connections of the user and pertaining to the one or more social network connections of the user that matches the name query, as a supplementary search result in a specified area of the SERP that is differentiated from any other matching Web results determined by the search engine in response to the search query, and
    (7) presents, in the specified area of the SERP that is outside of the domain associated with the social networking application, a selectable option for the user to add the one or more social network connections of the user to the user's social network as a first degree connection, wherein upon selection by the user of the option to add the at least one of the one or more social network connections as a first degree connection, automatically navigates the user away from the SERP and into the social networking application.

11. The system of claim 10, wherein the search engine determines that the name query matches the data associated with the one or more social network connections of the user by determining that the name query is an exact match with the data associated with at least one of the one or more social network connections of the user.

12. The system of claim 10, wherein wherein the search engine determines that the name query matches the data associated with the one or more social network connections of the user by determining that the name query is a derivative match with the data associated with at least one of the one or more social network connections of the user.

13. The system of claim 10, wherein the one or more social network connections of the user include at least one of second degree social network connections or relatively more remote social network connections.

14. A method for adding one or more social network connections of a user from the context of a SERP (search engine results page) that is outside of the domain associated with the social network, the electronic messages appearing to the receiving social network connections as though it was sent from a social networking domain, the method comprising:
- at a search engine outside of a domain associated with a social networking application, receiving a search query from a user;
- determining that at least a portion of the received search query is a name query;
- determining that the user is engaged in an active session with the social networking application and that data associated with one or more social network connections of the user is available from the social networking application;
- determining that the name query matches the data associated with the one or more social network connections of the user;
- presenting, on the SERP that is outside of the domain associated with the social networking application, information derived from the data associated with the one or more social network connections of the user and pertaining to the one or more social network connections of the user that matches the name query, as a supplementary search result in a specified area of the SERP that is differentiated from any other matching Web results determined by the search engine in response to the search query; and
- presenting, in the specified area of the SERP that is outside of the domain associated with the social networking application, a selectable option for the user to add at least one of the one or more social network connections of the user to the user's social network as a first degree connection, wherein upon selection by the user of the option to add the at least one of the one or more social network connections as a first degree connection, automatically navigating the user away from the SERP and into the social networking application.

15. The method of claim 14, wherein the method further comprises:
- receiving a user selection of the selectable option; and
- enabling, from the search engine results page that is outside of the domain associated with the social networking application, sending of the electronic message to the at least one of the one or more social network connections of the user.

16. The method of claim 15, wherein enabling sending of the electronic message to the at least one of the one or more social network connections of the user comprises presenting, in association with the search engine results page that is outside of the domain associated with the social networking application, a user interface for sending the electronic message.

17. The method of claim 14, wherein determining that the name query matches the data associated with the one or more social network connections of the user comprises determining that the name query is one of an exact match or a derivative match with the data associated with at least one of the one or more social network connections of the user.

18. The method of claim 14, wherein the one or more social network connections of the user include at least one of first degree social network connections and second degree social network connections.

19. The method of claim 14, further comprising: presenting, in the specified area of the SERP that is outside of the domain associated with the social networking application, a selectable option for the user to send an electronic message to at least one of the one or more social network connections of the user.

20. The method of claim 19, wherein the electronic message would appear to a recipient user as if the electronic message was sent directly from the social networking application.

* * * * *